United States Patent Office 3,476,768
Patented Nov. 4, 1969

3,476,768
THIENYLALANINE
James W. McFarland, Lyme, Conn., assignor to Chas. Pfizer & Co., Inc., New York, N.Y., a corporation of Delaware
No Drawing. Continuation-in-part of application Ser. No. 456,559, May 17, 1965. This application Dec. 13, 1965, Ser. No. 513,575
Int. Cl. C07d 63/12; A61k 27/00
U.S. Cl. 260—332.3    6 Claims

ABSTRACT OF THE DISCLOSURE

N,N-disubstituted(thienyl)propionamidines, N,N - disubstituted(thienyl)acrylamidines and their non-toxic acid addition salts, useful in the veterinary control of helminthiasis, are described.

---

This application is a continuation-in-part of copending application Ser. No. 456,559 filed May 17, 1965, and now abandoned.

This invention relates to a series of novel amidines and their non-toxic acid addition salts which are especially useful as anthelmintic agents. More particularly, it relates to N,N-disubstituted-2-thienylpropionamidines, N,N - disubstituted - 2 - thienylacrylamidines, the corresponding 3-thienyl derivatives and the non-toxic acid addition salts thereof as agents for the veterinary control of helminthiasis in animals.

Helminthiasis, the infestation of the animal body by various species of parasitic worms, is perhaps the most common, most serious and most wide-spread disease in the world today. Although the economic significance of this disease has led to extensive research for new and more effective anthelmintics, the countermeasures developed to date have not been entirely satisfactory for one or more reasons; e.g., poor therapeutic index, specificity of action, high cost, low activity, limited anthelmintic spectrum.

There is at present no broadly effective anthelmintic drug. While more than one roundworm may be susceptible to a given drug, no drug is recommended for therapy against both tapeworms and roundworms.

According to the present invention it has now been unexpectedly found that a series of novel N,N-disubstituted-2 - thienylpropionamidines, N,N - disubstituted-2-thienylacrylamidines, and the corresponding 3-thienyl derivatives having the general formulae

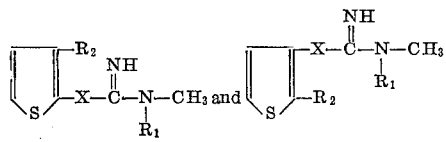

and the non-toxic acid addition salts thereof wherein $R_1$ is selected from the group consisting of methyl, ethyl, allyl, methoxy and methylamino; $R_2$ is selected from the group consisting of hydrogen and methyl; and X is selected from the group consisting of ethylene, and vinylene (cis and transisomers), are surprisingly effective agents in the control, e.g. therapeutic and prophylactic, of helminthiasis in animals when administered orally or parenterally, and possess favorable therapeutic ratios.

By "non-toxic" acid addition salts is meant those salts which are non-toxic at the dosages administered. The non-toxic acid addition salts of the above mentioned bases which may be employed are the water soluble and water insoluble salts such as the hydrochloride, hydrobromide, phosphate, nitrate, sulfate, acetate, hexafluorophosphate, citrate, gluconate, benzoate, propionate, butyrate, sulfosalicylate, maleate, laurate, malate, fumarate, succinate, oxalate, tartrate, amsonate (4,4'-diaminostilbene-2,2'-disulfonate), pamoate (1,1' - methylene - bis-3-hydroxy-2-naphthoate), stearate, 2-hydroxy-3- naphthoate, p-toluenesulfonate, suramin salt and resin adsorbates. The hexafluorophosphate salts are especially valuable as a means for isolating the novel amidine products of this invention from aqueous solutions of the free bases or of water soluble acid addition salts. They precipitate out rapidly and quantitatively or almost quantitatively as crystalline products and are easily purified as by washing with water. They thus serve as a means for recovering and purifying these novel amidines. The free base is, in turn, easily recovered from the hexafluorophosphate salt by neutralization.

These agents are active against both the mature and immature forms of helminths of the families Ancylostomidae, Strongyloidae and Trichostrongylidae. They are especially effective against the gastrointestinal parasites of ruminants (e.g., sheep, cattle, goats) and of non-ruminants such as dogs, cats and horses.

Methods of studying the sensitivity of this group of parasites to chemotherapeutic agents comprise selecting a laboratory-induced parastic infestation of a laboratory animal exhibiting a similar host-parasite relationship to that found between such parasites and domestic animals. Such a relationship exists between *Nematospiroides dubius* and laboratory mice. The test with *N. dubius* in laboratory mice is carried out by collecting the fecal matter of an infected mouse and suspending it in moist charcoal. Patties are prepared and these are incubated at room temperature for 4 to 5 days until the ova hatch and larvae are produced. The larvae are then collected and used to inoculate healthy mice. It has been found that an inoculum of 40 larvae per mouse yields a fluourishing infestation consisting of about 30 adult worms after a 14-day developmental period. Established anthelmintics have been found to be ineffective against an inoculum of this size.

As noted, above, these products are effective to a significant degree in controlling, that is, in eliminating and preventing, helminthiasis in animals by both the oral and parenteral routes of administration. The terms "controlling" and "control" as used herein are meant to include the treatment of helminthiasis in animals suffering therefrom and the prevention (prophylaxis) of helminthiasis in animals. Subcutaneous and intramuscular injections are the preferred methods of parenteral injection for several reasons; simplicity, convenience and the compounds appear less toxic. According to this method of the present invention, anthelmintic agents described herein or their non-toxic acid addition salts are administered parenterally, e.g. by subcutaneous or intramuscular injection, to animals suffering from helminthiasis of various types in a dosage equivalent to from about 20 mg. to about 150 mg. of the free base/kg. of body weight. A single injection is generally sufficient, but in the event multiple doses are employed, the injection can be repeated at regular, e.g., monthly, intervals, or more frequently if desired. Vehicles suitable for parenteral injection may be either aqueous such as water, isotonic saline, isotonic dextrose, Ringer's solution, or non-aqueous such as fatty oils of vegetable origin (cotton seed, peanut oil, corn, seasame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Administration of these anthelmintic agents in combination with hyaluronidase avoids local irritation. An increase in the rate of absorption of the drug is observed and the pain due to swelling and distention is greatly reduced if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

When administered by the oral route, the preferred route for administering the novel products of this invention, the compounds are given in dosages equivalent to from about 5 mg. to about 150 mg. of free base/kg. of body weight. This can be achieved by a number of methods including mixing with the feed, dosage unit formulations such as capsules, tablets, liquid mixtures and solutions including drench solutions, or they can be administered in admixture with minerals such as sodium chloride which are frequently fed to animals as a supplement. Although the dosage specified is based on active ingredient, namely the base form of the amidine, in practical use the non-toxic acid addition salts specified and the free base can be used interchangeably; except as otherwise noted below. The non-toxic acid addition salts represent preferred forms of these novel amidines for the control of helminthiasis in view of their greater stability relative to that of the free bases.

For therapeutic use, a dosage equivalent to 25 to 100 mg. of free base/kg. of body weight is recommended. Ordinarily a single dose is sufficient, but in the event multiple doses are employed, this dose is repeated on 2 or 3 consecutive days. Since the present method is effective against not only the mature worms but also against the larval stages, it is not necessary to repeat the dosage after a period of 2 to 3 weeks as is commonly done with prior anthelmintic agents. For administration to sheep, goats, cattle, horses and swine on a therapeutic basis, a drench solution which is squirted down the animal's throat by means of a drenching syringe is convenient. For this purpose an aqueous solution of a water soluble non-toxic salt is generally used. From the standpoint of convenience and ease of preparation the hydrochloride salts are favored. Solutions having concentrations ranging from about 3% up to the limit of solubility of the salt in water are satisfactory for drench solutions. More dilute solutions, however, can be supplied for drinking purposes. A 0.1% solution is useful.

For prophylactic use, 5 to 50 mg. (calculated as free base) per kg. of body weight daily is administered. This is the preferred range. Higher dosages can, of course, be used but are not desirable from an economic standpoint. The above methods of administration are suitable although administration in the animal's food, water, or mineral mixture is more convenient.

Boluses and capsules are also used for the therapeutic treatment of animals. For animals weighing from 30 to 1000 pounds the usual dose, calculated as free base, ranges from ½ to 45 grams. Boluses of suitable sizes containing these materials can be prepared by conventional methods.

Dry mineral mixtures containing the products of this invention are prepared containing from 0.01 to about 10% of the active ingredient mixed with salt (sodium chloride) and other minerals with which it is desired to treat the animal. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.01 to 10% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of his daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 2 to 5%, depending again upon the palatability of the material, are sometimes useful. Additionally, these compounds can be used in micronized form especially when used in emulsions or suspensions by either the oral or parenteral route of administration.

The novel products of this invention are prepared by known methods. Those compounds wherein X is vinylene are prepared by a Knoevenagel type condensation of the appropriate thiophene carboxaldehyde with cyanoacetic acid in the presence of an appropriate catalyst. As catalyst, nitrogen bases, e.g., ammonia, primary and secondary amines, pyridine, piperidine, triethanolamine, can be used. The favored catalyst system is ammonium acetate-pyridine. The reaction is conducted in a reaction-inert solvent system such as in toluene, benzene, xylene, preferably with continuous removal of by-product water. Additionally, the nitrogenous base can be used as solvent. The reaction is advantageously run at a temperature of from about 80° C. to the reflux temperature of the solvent and preferably at a temperature sufficient to permit simultaneous removal of the by-product water by azeotropic distillation.

The thienylacrylonitriles thus produced are then converted to imido esters by addition of alcohols under the influence of hydrogen chloride under anhydrous conditions. The usual conditions comprise passing dry hydrogen chloride into an equimolar mixture of the thienylacrylonitrile and an alcohol in ether or dioxane solution. The operative temperature range is from about 0° C. to about 35° C. and preferably from about 0° C. to 15° C. The imido ester hydrochloride is then ammonolyzed to the desired amidine by reaction with an alcoholic solution of the appropriate amine. Alternatively, the imido ester, free base form, is reacted with an alcoholic solution of the amine hydrochloride or other acid addition salt. Suitable alcohols are methanol, ethanol, butanol, propanol and 2-propanol. Other solvents such as dioxane, tetrahydrofuran, ethylene glycols can also be used. An excess of the amine can be used as solvent, if desired. For large scale reactions, that is, reactions larger than laboratory scale, the use of a solvent of the type mentioned above is preferred. The ammonolysis is carried out at a temperature of from about −5° C. to 50° C. and preferably at from −5° C. to about 30° C. until formation of the product is complete or essentially complete. The amidine hydrochloride is recovered, e.g. removal of the solvent, and the residue recrystallized from a suitable solvent system.

In an alternative method, the compounds wherein X is vinylene are prepared by reaction of 2-thienylacrylamide with 1,3-propanesultone (Reid and Schmidt, Ann., 676, 114 (1964)) to produce 3-(1'-imine-(3-thienylallyloxy))-propane sulfonic acid, an imido ester in which the newly introduced radical is 3-propanesulfonic acid. The thus produced imido ester is then reacted with the appropriate amine to give the desired amidine.

Those novel compounds wherein X is ethylene are prepared from the thienylacrylonitriles by (a) catalytic hydrogenation to the corresponding thienylpropionitrile; (b) conversion of the thienylpropionitrile to an amido ester; and (c) ammonolysis of the imido ester to the desired amidine.

The catalytic hydrogenation is conducted with a noble metal catalyst, e.g. palladium, platinum, rhenium, rhodium, osmium, iridium. As solvent system a suitable reaction-inert solvent should be used. Methanol and other alcohols are satisfactory. The system can be neutral, basic or acidic. A neutral to slightly basic system is generally favored. The pressure and temperature appear not to be critical factors. Pressures of up to about 500 p.s.i. afford good yields. Reaction temperatures up to 100° C. can be used. The reaction should be stopped when the theoretical amount of hydrogen is taken up.

Steps (b) and (c) above are conducted in the same manner as is described above for the preparation of the vinylene compounds.

The imido ester hydrochlorides are converted to their free base forms by neutralization with aqueous solutions of sodium bicarbonate or potassium carbonate under ether. The imido ester is recovered from the ether solution by evaporation of the solvent. Other acid addition salts can be readily prepared simply by dissolving the free base in a suitable solvent, e.g. acetone, water, a lower aliphatic alcohol (ethanol, isopropanol) containing the desired acid, or to which the desired acid is subsequently added. The salts are recovered by filtration, precipitation with a non-solvent, by evaporation of the solvent, or in the case of aqueous solutions, by lyophilization. In this manner the sulphate, nitrate, phosphate, acetate, propionate, butyrate, citrate, gluconate, benzoate, malate fumarate maleate, pamoate, amsonate, the isomeric hydroxy naphthoates and the sulphosalicylate and other salts can be prepared. In the case of the dibasic acids, e.g., pamoic, amsonic, a 1:2 molar ratio of acid to base is used to give the 1:2 salt. The inorganic polybasic acids are generally used in a 1:1 molar ratio with the desired base.

Resin adsorbates of the amidines of this invention are conveniently prepared by slurrying an aqueous solution of a water soluble salt of the amidine of choice with a suspension of the sodium form of a cation exchange resin for a sufficient period to permit adsorption of the compound by the resin. Suitable resins are the strong sulfonic acid type cation resins, such as Dowex 50, Amberlite CG–120, Amberlite IR–120, Zeo-Karb 225 (available from the Dow Chemical Co., Rohm & Haas, and the Permutit Co., Ltd., respectively) all of which are sulfonated styrene divinyl-benzene polymers cross-linked to varying degrees.

The following examples are provided to illustrate in greater detail the manner of practicing the present invention. They are, however, not to be considered as limiting the scope thereof in any way. (The dosages used in the following examples are calculated as the free base.)

Example I.—3-(2-thienyl)acrylonitrile

A solution of 123.4 g. (1.10 moles) of 2-thiophenecarboxaldehyde, 85.0 g. (1.00 mole) cyanoacetic acid, 3 g. of ammonium acetate, 110 ml. of pyridine, and 200 ml. of toluene is heated under reflux in an apparatus which includes a Dean-Stark moisture trap. Heating is continued for 48 hours during which time the solution becomes very dark. After the heating period is over the solution is allowed to cool and the solvents then evaporated under reduced pressure. The less volatile residue is fractionally distilled through a column packed with porcelain saddles to yield the product which is initially a colorless oil: B.P. 154° C. at 30 mm.; yield, 107.4 g. (79%); $n_D^{25}$ 1.6373.

Example II.—3-(3-thienyl)acrylonitrile

The procedure of Example I is repeated but substituting 3-thiophenecarboxaldehyde for 2-thiophenecarboxaldehyde to give a 47% yield of the title product; B.P. 134° C. at 14 mm., $n_D^{23}$ 1.6192.

Analysis.— Calcd. for $C_7H_5NS$: C, 62.19; H, 3.73; N, 10.36%. Found: C, 61.44; H, 3.95; N, 10.82%.

Following this procedure but using 3-methyl-2-thiophenecarboxaldehyde and 2-methyl - 3 - thiophenecarboxaldehyde as reactants in place of 3-thiophenecarboxaldehyde produces 3-(3-methyl-2-thienyl)acrylonitrile and 3-(2-methyl-3-thienyl)acrylonitrile, respectively.

Example III.—3-(2-thienyl)propionitrile

A pressure bottle is charged with 67.6 g. (0.5 mole) of 3-(2-thienyl)acrylonitrile, 50 ml. of 1 N sodium hydroxide, 300 ml. of methanol, and 10 g. of 5% palladium-on-carbon catalyst. The pressure bottle is swept free of air by nitrogen and then fitted onto a Paar hydrogenation apparatus. Hydrogenation is conducted in the normal manner until the theoretical amount (0.5 mole) of hydrogen is absorbed. The catalyst is removed by filtration, and the filtrate concentrated to a mixture of an oil and aqueous sodium hydroxide. Water is added to this mixture and the resulting aqueous solution extracted with ether. The ether extract is dried, filtered and evaporated under reduced pressure to a pale yellow oil which is fractionally distilled through a column packed with porcelain saddles to give the product; B.P. 156°–158° C. at 35 mm.; $n_D^{25}$ 1.5372; yield 49.5 g. (72%).

Example IV

The products of Example II are subjected to the procedure of Example III to give the corresponding propionitriles as pale yellow oils.

Example V.—Eethyl 3-(2-thienyl)propionimidate hydrochloride

A solution of 162.4 g. (1.18 moles) of 3-(2-thienyl) propionitrile in 60.0 g. (1.3 moles) dry ethanol and 360 ml. of dry ether is saturated with hydrogen chloride while the temperature is maintained at below 10° C. After three hours the yellow orange solution is saturated and then stirred at ambient temperature overnight under a dry nitrogen atmosphere. Sufficient ether is lost during this time to produce a solid cake in the reaction flask, which is broken up by the addition of fresh ether. The product is collected, washed thoroughly with ether and dried at room temperature for three hours, to give 224 g. (86% yield) of product melting at 122°–124° C. The product is stored under nitrogen in the refrigerator.

Repetition of this procedure but replacing ethanol by methanol, n-propanol or n-butanol produces the corresponding alkyl 3-(2-thienyl)propionimidate hydrochloride.

Example VI

The following propionimidates are prepared from the products of Example IV by the procedure of Example V: ethyl 3 - (3 - thienyl)propionimidate hydrochloride; ethyl 3 - (3 - methyl - 2 - thienyl)propionimidate hydrochloride; ethyl 3 - (2 - methyl - 3 - thienyl)propionimidate hydrochloride.

Similarly the corresponding methyl, n-propyl and n-butyl imido esters are prepared by substituting the appropriate alcohol for ethanol.

Example VII.—Methyl 3-(2-thienyl)acrylimidate hydrochloride

Into a solution of 142.4 g. (1.06 moles) of 3-(2-thienyl)-acrylonitrile and 33.8 g. (1.06 moles) of methanol and 240 ml. of anhydrous ether is introduced, with stirring, 42.2 g. (1.16 moles) of hydrogen chloride over a period of two hours. The temperature is maintained at 0° C. The dark brown solution is refrigerated overnight, then stirred for eight hours at 10–15° C., then again refrigerated for two days. The solid is filtered off and washed with ether. After air-drying at 60° C. there is obtained 117 g. (54.6%) of yellow product melting at 124.8–128.0° C.

By means of this procedure the corresponding ethyl, n-propyl and n-butyl imido esters are prepared from the proper alcohol.

Example VIII

Following the procedure of Example VII the products of Example II are similarly converted to the corresponding acrylimidates. The following compounds are thus prepared:

methyl 3-(3-thienyl)acrylimidate hydrochloride
methyl 3-(3-methyl-2-thienyl)acrylimidate hydrochloride
methyl 3-(2-methyl-3-thienyl)acrylimidate hydrochloride Replacement of methanol by ethanol or n-propanol produces the corresponding ethyl and n-propyl imido esters.

Example IX.—N,N-dimethyl-3-(2-thienyl)propionamidine

This procedure illustrates the reaction of an imido ester hydrochloride with an amine in free base form to produce an amidine.

Ethyl thienylpropionimidate hydrochloride (22.0 g.; 0.10 mole) is placed in a pressure bottle and cooled in an ice bath. Dimethylamine (2.5 N in methanol; 125 ml.; 0.30 mole) is added and the mixture stirred until solution is complete. The reaction mixture is held at room temperature for 48 hours then evaporated to a yellow crystalline mass. Recrystallization from ethanol; ether (2:1) produces colorless needles. A second recrystallization from acetone:methanol (5:1) or from methanol:ethylacetate gives the pure product: M.P. 175.5°–177° C.

Analysis.—Calcd. for $C_9H_{15}N_2SCl$: C, 49.41; H, 6.91; N, 12.81; S, 14.66; Cl, 16.21%. Found: C, 49.47; H, 7.00; N, 12.87; S, 14.94; Cl, 16.11%.

Example X.—N-ethyl-N-methyl-3-(2-thienyl)acrylamidine hydrochloride

This procedure exemplifies the conversion of the free base form of an imido ester to an amidine by reaction with an amine salt.

To a stirred, ice-cooled mixture of saturated sodium carbonate (50 ml.), water (50 ml.) and ether (200 ml.), is added methyl 3-(2-thienyl)acrylimidate hydrochloride (20.4 g.). After 15 minutes stirring the ether phase is separated, dried and evaporated under reduced pressure to give 16.5 g. of methyl 3-(2-thienyl)acrylimidate as an oil.

A solution of N-methylethyl amine hydrochloride (5.0 g.; 0.05 mole) in methanol (25 ml.) is cooled to 0° C. and an ice-cooled solution of methyl 3-(2-thienyl)acrylimidate (8.5 g.; 0.05 mole) in methanol (25 ml.) added. The mixture is allowed to warm to room temperature and then to stand overnight. The solvent is evaporated under reduced pressure to furnish an oil (13.0 g.) which is crystallized from hot acetone. Recrystallization from methanol/acetone provides the pure product; M.P. 194–195° C.

Analysis.—Calcd. for $C_{10}H_{15}N_2SCl$: C, 52.04; H, 6.55; N, 12.15%. Found: C, 52.25; H, 6.48; N, 11.98%.

Example XI

The amidines listed below are prepared from the appropriate reactants following the procedures of Examples IX and X.

In those cases wherein a salt other than the hydrochloride or hexafluorophosphate salt is listed, the initially produced hydrochloride salt is converted to its free base according to the procedure given in Example X but using sodium hydroxide in place of sodium carbonate. The free base is then treated with an equimolar quantity of the acid corresponding to the desired salt in methanol solution. The salt is then isolated by evaporation of the solvent and purified by recrystallization from a suitable solvent system. In the preparations listed in which a mixture of solvents is used for recrystallization the salt is dissolved in a minimum volume of the warm first solvent and the second solvent then added until the solution becomes cloudy. The mixture is then heated to boiling and cooled to precipitate the pure salt.

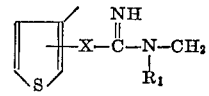

The hexafluorophosphate salts are prepared directly from the hydrochloride salt by dissolving said salt in water and treating with 65% hexafluorophosphoric acid. The resulting precipitate is filtered off, washed with water and recrystallized as described above.

Pertinent data on these compounds are provided in Table I.

Similarly, compounds having the formula

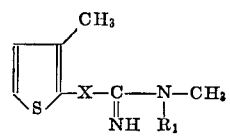

are prepared. Table II lists pertinent data.

TABLE I

| Isomer | X | R₁ | Method of Example | Salt | M.P. (°C.) | Solvent of Recrystallization | Formula | Carbon Calcd. | Carbon Found | Hydrogen Calcd. | Hydrogen Found | Nitrogen Calcd. | Nitrogen Found |
|---|---|---|---|---|---|---|---|---|---|---|---|---|---|
| 2 | —CH₂—CH₂— | —C₂H₅ | X | Sulfosalicylate | 191-193 | MeOH/EtOAc | $C_{17}H_{22}N_2O_6S_2$ | 49.26 | 49.25 | 5.35 | 5.12 | 6.76 | 6.50 |
| 2 | —CH₂—CH₂— | CH₂=CH—CH₂— | IX | Fumarate | 116-118 | MeOH/EtOAc | $C_{15}H_{20}N_2O_4S$ | 55.53 | 55.25 | 6.22 | 6.09 | 8.64 | 8.37 |
| 2 | —CH₂—CH₂— | —OCH₃ | X | Hydrochloride | 125-127 | 2-PrOH/(isoPr)₂O | $C_8H_{15}N_2OSCl$ | 46.04 | 45.96 | 6.44 | 6.25 | 11.94 | 11.58 |
| 2 | —CH₂—CH₂— | —NHCH₃ | IX | do | 155-156 | MeOH/EtOAc | $C_8H_{16}N_3SCl$ | 46.24 | 46.16 | 6.90 | 6.65 | 17.98 | 18.13 |
| 2 | —CH=CH— | —CH₃ | IX | do | 257-258¹ | MeOH/EtOAc | $C_9H_{13}N_3SCl$ | 49.87 | 49.87 | 6.04 | 6.11 | 12.93 | 12.98 |
| 2 | —CH=CH— | —NHCH₃ | IX | Hexafluorophosphate | 144-146 (dec.) | Ethanol | $C_8H_{14}N_3PSF_6$ | 31.67 | 31.79 | 4.14 | 3.97 | 12.31 | 12.36 |
| 3 | —CH=CH— | —CH₃ | IX | do | 232-233 | Acetone/hexane | $C_8H_{14}N_2PSF_6$ | 33.13 | 32.71 | 4.02 | 4.04 | 8.59 | 8.41 |

¹ Dec.

TABLE II

| Isomer | X | R₁ | Method of Example | Salt | M.P. (°C.) | Solvent of Recrystallization | Formula | Carbon Calcd. | Carbon Found | Hydrogen Calcd. | Hydrogen Found | Nitrogen Calcd. | Nitrogen Found |
|---|---|---|---|---|---|---|---|---|---|---|---|---|---|
| 2 | —CH₂—CH₂— | —CH₃ | IX | Hydrochloride | 180-181 | 2-PrOH | $C_{10}H_{17}ClN_2S$ | 51.59 | 51.71 | 7.36 | 7.33 | 12.05 | 12.0 |
| 2 | —CH=CH— | —CH₃ | IX | do | 244-245 | 2-PrOH | $C_{10}H_{15}ClN_2S$ | 52.04 | 51.97 | 6.55 | 6.65 | 12.14 | 12.1 |

Example XII

The procedures of Examples IX and X are repeated but using the appropriate reactants to produce the following amidine salts:

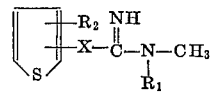

| R₂ | R₁ | X | Salt |
|---|---|---|---|
| H | —CH₃ | 3-CH₂—CH₂— | Hydrochloride. |
| H | —C₂H₅ | 3-CH₂—CH₂— | Do. |
| H | —CH₂—CH=CH₂ | 3-CH₂—CH₂— | Hexafluorophosphate. |
| H | —OCH₃ | 3-CH₂—CH₂— | Hydrochloride. |
| H | —NHCH₃ | 3-CH₂—CH₂— | Do. |
| 2-CH₃ | —CH₃ | 3-CH₂—CH₂— | Do. |
| 2-CH₃ | —C₂H₅ | 3-CH₂—CH₂— | Do. |
| 2-CH₃ | —CH₂—CH=CH₂ | 3-CH₂—CH₂— | Do. |
| 2-CH₃ | —OCH₃ | 3-CH₂—CH₂— | Do. |
| 2-CH₃ | —NHCH₃ | 3-CH₂—CH₂— | Do. |
| H | —C₂H₅ | 3-CH=CH— | Hexafluorophosphate. |
| H | —CH₂—CH=CH₂ | 3-CH=CH— | Do. |
| H | —OCH₃ | 3-CH=CH— | Do. |
| H | —NHCH₃ | 3-CH=CH— | Hydrochloride. |
| 2-CH₃ | —CH₃ | 3-CH=CH— | Hexafluorophospahte. |
| 2-CH₃ | —C₂H₅ | 3-CH=CH— | Do. |
| 2-CH₃ | —CH₂—CH=CH₂ | 3-CH=CH— | Do. |
| 2-CH₃ | —OCH₃ | 3-CH=CH— | Do. |
| 2-CH₃ | —NHCH₃ | 3-CH=CH— | Do. |
| 3-CH₃ | —C₂H₅ | 2-CH₂CH₂— | Hydrochloride. |
| 3-CH₃ | —CH₂—CH=CH₂ | 2-CH₂—CH₂— | Do. |
| 3-CH₃ | —OCH₃ | 2-CH₂—CH₂— | Do. |
| 3-CH₃ | —NHCH₃ | 2-CH₂—CH₂— | Do. |
| 3-CH₃ | —C₂H₅ | 2-CH=CH— | Hexafluorophosphate. |
| 3-CH₃ | —CH₂-CH=CH₂ | 2-CH=CH— | Do. |
| 3-CH₃ | —OCH₃ | 2-CH=CH— | Do. |
| 3-CH₃ | —NHCH₃ | 2-CH=CH— | Hydrochloride. |
| H | —CH₂-CH=CH₂ | 2-CH=CH— | Do. |
| H | —OCH₃ | 2-CH=CH— | Hexafluorophosphate. |

Example XIII

N,N - dimethyl - 3-(2-thienyl)propionamidine hydrochloride (5.0 g.) is dissolved in water (25 ml.), the solution filtered and added to a well-stirred suspension of Amberlite CG-120 (sodium form of a cation exchange resin) (5.9 g.) in 100 ml. water. The mixture is stirred for 3 hours then filtered, washed with water and dried in vacuo.

Resin adsorbates of the products of Examples IX-XII can be prepared in like manner.

Example XIV

The hydrochloride salts of the products of Examples IX-XII are neutralized to their free bases according to the procedure set forth in Example IX and the resulting bases converted to acid addition salts by treatmenft with an equimolar proportion of the appropriate acid in methanol as solvent. The salts are recovered by precipitation with a non-solvent, e.g. ether, hexane, or, alternatively, if desired, by evaporation of the solvent. The following acid addition salts are thus prepared: p-toluene-sulfonate, pamoate, amsonate, 2-hydroxy-3-napthoate, stearate, citrate, gluconate, benzoate, acetate, propionate, butyrate, sulfate, nitrate, phosphate, hydrobromide, t-butylacetate, trimethylacetate, oxalate, succinate, malate and tartrate.

Example XV.—Tablets and boluses

A convenient tablet size is one containing 250 mg. of the drug. Such tablets can be prepared by thoroughly blending 250 g. of N,N-dimethyl-3-(2-thienyl)propionamidine hydrochloride or the equivalent weight of other compound within the scope of this invention and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from ½ to 45 g. per day depending again upon the body weight of the animal. Boluses of various sizes can be prepared in the same fashion by simply selecting a die of appropriate size.

Example XVI.—Capsules

The products of this invention and their acid addition salts can be conveniently encapsulated in hard gelatin capsules. For therapeutic and prophylactic purposes, from about 250 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus, a hard gelatin capsule can be prepared by thoroughly blending two parts by weight of N,N-dimethyl-3-(2-thienyl)acrylamidine hydrochloride and calcium phosphate in a twin shell blender. The powder is then subdivided, and loaded into hard gelatin capsules in such a fashion that each capsule contains 250 mg. active ingredient.

Example XVII.—Mineral mixture

Such a mixture can be conveniently made by mixing N-methyl-N-allyl-3-(2-thienyl)propionamidine fumarate, equivalent to 1 part by weight of free base, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animals.

In like manner mineral mixtures of the other products within the ambit of this invention can be prepared.

Example XVIII.—Feed mixture

Prophylactic use of these products can be properly accomplished by adding the agent to a feed mixture. The usual prophylactic dose is from about 2.5 to 25 g. (calculated as free base) daily for 1000 pound cattle. Assuming such animal consumes 10 lbs. of feed supplement per day, at least 10 lbs. of the chosen agent per ton would be incorporated. Depending upon then feed consumption of the animal and the dosage employed, the proportion of agent in the feed varies from .05% up to about 10% on a weight basis.

Example XIX

Lambs naturally infected with gastrointestinal helminths can be cleared to a significant degree by the subcutaneous administration of N,N - dimethyl-3-(2-thienyl)propionamidine hydrochloride at levels of from about 20 mg./kg. to about 150 mg./kg. The local edema which frequently accompanies the injection can be prevented or at least minimized by the simultaneous administration of about 150 units (U.S.P.) of hyaluronidase.

Similarly, the other products of this invention can be used for the control of helminthic infections.

Example XX

The anthelmintic activity of the compounds of this invention is assessed using laboratory mice infested with *Nematospiroides dubius*. Results are summarized below.

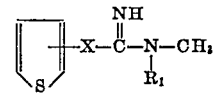

| Isomer | X | $R_1$ | Salt | Dose (mg./kg.× days) | Percent Removal of Worms |
|---|---|---|---|---|---|
| 2 | —CH$_2$CH$_2$— | —CH$_3$ | Hydrochloride | 50×3 | 97 |
|   |   |   |   | 25×3 | 75 |
| 2 | —CH$_2$—CH$_2$— | —C$_2$H$_5$ | Sulfosalicylate | 100×3 | 95 |
| 2 | —CH$_2$CH$_2$— | —CH$_2$—CH=CH$_2$ | Fumarate | 125×1 | 89 |
|   |   |   |   | 62.5×1 | 50 |
| 2 | —CH$_2$CH$_2$— | —OCH$_3$ | Hydrochloride | 50×3 | 97 |
|   |   |   |   | 25×3 | 73 |
| 2 | —CH$_2$CH$_2$— | —NHCH$_3$ | do | 125×3 | 98 |
| 2 | —CH=CH—ᵃ | —CH$_3$ | do | 50×3 | 100 |
|   |   |   |   | 25×3 | 100 |
|   |   |   |   | 12.5×3 | 77 |
|   |   |   |   | 6×3 | 55 |
| 2 | —CH=CH— | —C$_2$H$_5$ | do | 50×3 | 100 |
|   |   |   |   | 25×3 | 68 |
| 2 | —CH=CH— | —NHCH$_3$ | Hexafluorophosphate | 1,000×1 | 100 |
|   |   |   |   | 500×3 | 100 |
|   |   |   |   | 250×3 | 95 |
|   |   |   |   | 125×3 | 71 |
| 3 | —CH=CH— | —CH$_3$ | do | 250×3 | 98 |

ᵃ Trans.

Example XXI

The larvacidal activity of N,N-dimethyl-3-(2-thienyl)-propionamidine hydrochloride against larvae of Haemonchus, Trichostrongylus and Strongyloides cultured from the fecal material of sheep is determined as follows.

Fecal material is cultured at 23° C., the filariform larvae removed, placed in a saline solution and counted by the dilution method. Approximately 100 larvae are then placed on watch glasses to which various concentrations of anthelmintic agent are added (0.1%–20%). The final volume of solution is 10 ml. in each case. The mixing of larvae and anthelmintic agent is done under a dissecting microscope and the immobilization time and actual death time noted.

The filariform larvae have a rather fast undulating motion. Upon addition of the anthelmintic containing solution the larvae lose their progressive undulating motion but continue to exhibit slow local undulations. The thus immobilized larvae soon die. The higher concentrations, as expected, are exceptionally rapid in their larvacidal action. The remaining products of this invention exhibit similar larvacidal action.

Example XXII

A pen previously occupied for two weeks by two sheep naturally infested with digestive Strongyles is sprayed with a 20% aqueous solution of N,N-dimethyl-3-(2-thienyl)acrylamidine hydrochloride at the rate of 0.5 gallon per 1000 square feet after removal of the infected sheep. The following day two nematode-free sheep are placed in the enclosure. Daily checks of their feces for two weeks followed by post-mortem examination show no nematode infestation.

Example XXIII

The effect of N,N-dimethyl-3-(2-thienyl)propionamidine hydrochloride against the migratory phases of

*Ascaris suum* is determined as follows.

Fifteen pigs about five weeks old are divided into three groups of five.

Group 1—Non-infected, non-medicated;
Group 2—Laboratory infected with *Ascaris suum*, non-medicated;
Group 3—Laboratory infected with *Ascaris suum*, medicated with the above drug beginning 2 days before infection and continuing for 5 days after infection. The drug is administered orally at 50 mg./kg. body weight.

The test animals are infected with $4 \times 10^5$ embryonated *Ascaris suum* ova using a stomach tube. All animals are sacrificed 8 days after the infection and the livers and lungs inspected for characteristic lesions and the number of larvae present.

The drug is thus found to be highly effective in protecting pigs against *Ascaris suum* infection. The infected, but non-medicated, animals develop thumping and their livers and lungs are covered with innumerable mottling lesions and petechial hemorrahages. The infected but medicated animals show no abnormal clinical signs during the experiment. Their livers show some mottling lesions. However, similar lesions appear in the non-infected, non-medicated animals indicating they contain some natural *Ascaris suum* infection.

Similar protection is provided by the remaining compounds of this invention.

What is claimed is:

1. A compound selected from the group consisting of

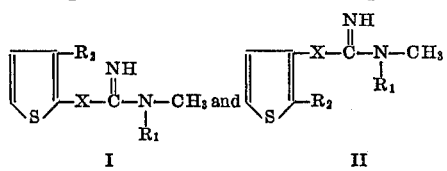

and the non-toxic acid addition salts thereof wherein:

X is selected from the group consisting of ethylene and vinylene;
$R_1$ is selected from the group consisting of methyl, ethyl, allyl, methoxy and methylamino; and
$R_2$ is selected from the group consisting of hydrogen and methyl.

2. The compound of claim 1, Formula I, wherein $R_1$ is methyl, $R_2$ is hydrogen and X is vinylene.

3. The hydrochloride salt of the compound of claim 1, Formula I, wherein each of $R_1$ and $R_2$ is methyl and X is vinylene.

4. The hydrochloride salt of the compound of claim 1, Formula II, wherein $R_1$ is allyl, $R_2$ is hydrogen, and X is ethylene.

5. The tartrate salt of the compound of claim 1, Formula I, wherein $R_1$ is methylamino, $R_2$ is methyl and X is vinylene.

6. The hexafluorophosphate salt of the compound of claim 1, Formula I, wherein $R_1$ is methyl, $R_2$ is hydrogen and X is ethylene.

References Cited

UNITED STATES PATENTS 2,575,991  11/1951  Baltzly et al. _____ 260—564

OTHER REFERENCES

Gilman et al., JACS, 47: 245–54 (1 1925).

HENRY R. JILES, Primary Examiner

C. M. SHURKO, Assistant Examiner

U.S. Cl. X.R.

260—329, 332.3; 424—275, 202, 230